(12) United States Patent
Thompson

(10) Patent No.: US 11,142,274 B1
(45) Date of Patent: Oct. 12, 2021

(54) RECUMBENT BICYCLE AND METHODS OF RIDING EMPLOYING SUPPLEMENTAL UPPER BODY POWER, ENHANCED AERODYNAMICS, STABILITY, AND CONTROL

(71) Applicant: Ronald Alan Thompson, Bel Air, MD (US)

(72) Inventor: Ronald Alan Thompson, Bel Air, MD (US)

( * ) Notice: Subject to any disclaimer, the term of this patent is extended or adjusted under 35 U.S.C. 154(b) by 109 days.

(21) Appl. No.: 16/238,744

(22) Filed: Jan. 3, 2019

(51) Int. Cl.
| | |
|---|---|
| *B62K 3/00* | (2006.01) |
| *B62K 3/02* | (2006.01) |
| *B62J 17/02* | (2006.01) |
| *B62J 1/28* | (2006.01) |
| *B62L 3/02* | (2006.01) |
| *B62M 9/00* | (2006.01) |
| *B62K 21/04* | (2006.01) |
| *B62K 21/02* | (2006.01) |

(52) U.S. Cl.
CPC .................. *B62K 3/005* (2013.01); *B62J 1/28* (2013.01); *B62J 17/02* (2013.01); *B62K 3/02* (2013.01); *B62K 21/02* (2013.01); *B62K 21/04* (2013.01); *B62L 3/02* (2013.01); *B62M 9/00* (2013.01)

(58) Field of Classification Search
CPC .......... B62K 3/005; B62K 3/02; B62K 21/02; B62K 9/00; B62K 21/04; B62J 1/28; B62J 17/02; B62L 3/02; B62M 9/00
See application file for complete search history.

(56) References Cited

U.S. PATENT DOCUMENTS

| | | | | |
|---|---|---|---|---|
| 446,098 A | * | 2/1891 | Hibbert et al. | B62K 3/005 280/261 |
| 2,236,127 A | * | 3/1941 | Alexander | B62K 21/02 280/279 |

(Continued)

FOREIGN PATENT DOCUMENTS

| | | | | |
|---|---|---|---|---|
| DE | 19736266 | | 2/1999 | |
| DE | 102004019621 A1 | * | 11/2005 | ............. B62K 3/005 |

OTHER PUBLICATIONS

Thomas Kretschmer, Direct Drive (Chainless) Recumbent Bicycles, Human Power, No. 49, winter 1999-2000, pp. 11-14.

(Continued)

*Primary Examiner* — Christopher R Harmon
(74) *Attorney, Agent, or Firm* — Boudwin Intellectual Property; Daniel Boudwin

(57) ABSTRACT

Disclosed is a recumbent bicycle configuration, structure and methods which allow effective hand power input using only components otherwise required to pedal and steer. Force and work based hand power methods are used. The effect is comparable to standing and pedaling a conventional bicycle. The configuration has front wheel drive and steering. The crankset is fork mounted on or near the steering axis. The fork has a double triangulated torque tube structure which is rigid from the hand grips to the crankshaft endpoints to torsional hand and foot forces in opposition. Pedal forces on steering are controlled by a hand over foot leverage ratio, and by use of trail, which is increasingly effective with speed. A fork mounted fairing can be used. For stability, the fairing aerodynamic center of presented area is ahead of the steering axis. Hand, foot and selective braking inputs are used for enhanced control.

14 Claims, 8 Drawing Sheets

(56) References Cited

U.S. PATENT DOCUMENTS

| | | | |
|---|---|---|---|
| 2,505,464 A | | 4/1950 | Debuit |
| 3,910,599 A | * | 10/1975 | Thomas .................. B62M 1/12 |
| | | | 280/234 |
| 4,270,766 A | * | 6/1981 | Thomas ................. B62K 3/005 |
| | | | 280/234 |
| 4,303,255 A | | 12/1981 | Thomas |
| 4,326,728 A | | 4/1982 | Tatch |
| 4,410,198 A | | 10/1983 | Fernandes |
| 4,548,421 A | * | 10/1985 | Wiener ................... B62K 5/05 |
| | | | 280/267 |
| 4,655,497 A | | 4/1987 | Mallett |
| 4,730,840 A | * | 3/1988 | Goldmeier ............... B62H 1/12 |
| | | | 280/210 |
| 5,419,574 A | * | 5/1995 | Krumm ................. B62K 3/005 |
| | | | 280/278 |
| 5,553,879 A | * | 9/1996 | Niemeyer ................ B62K 9/02 |
| | | | 280/279 |
| 5,584,494 A | * | 12/1996 | Krumm ................. B62K 3/005 |
| | | | 280/288.1 |
| 5,904,218 A | * | 5/1999 | Watkins ................. B62D 61/02 |
| | | | 180/209 |
| 6,419,254 B1 | | 7/2002 | Langen |
| 7,246,809 B2 | | 7/2007 | Rutkowski |
| 7,311,321 B2 | | 12/2007 | Rutkowski |
| 7,753,388 B2 | | 7/2010 | Tolhurst |
| 9,139,254 B2 | | 9/2015 | Garnet |
| 2002/0047245 A1 | * | 4/2002 | Greene, Jr. ............. B62K 5/06 |
| | | | 280/259 |
| 2003/0057674 A1 | * | 3/2003 | Lopez ................... B62K 27/00 |
| | | | 280/261 |
| 2006/0226630 A1 | * | 10/2006 | Tolhurst ................ B62K 3/005 |
| | | | 280/261 |
| 2009/0072511 A1 | * | 3/2009 | Tolhurst ................ B62K 3/005 |
| | | | 280/281.1 |
| 2009/0184488 A1 | * | 7/2009 | Dixon ..................... B62K 7/00 |
| | | | 280/202 |
| 2019/0002055 A1 | * | 1/2019 | Reed ......................... B62J 1/08 |
| 2019/0071147 A1 | * | 3/2019 | Minaker ................ B62K 25/24 |

OTHER PUBLICATIONS

John Stegmann, Chain of Thought, Velo Vision, Dec. 2002, pp. 22-25.

Jeremy M. Garnet, Ottawa, ON, Canada, Ergonomics of Direct-Drive Recumbent Bicycles, updated on-line publication, pp. 1-32.

Jeremy M. Garnet, Extraction From Garnet, from on-line publication at velotegra.com/wordpress1.

Marc Le Borgne, Extract from Kervelo Website Dec. 19, 2017, kervelo-bike.com.

Marc Le Borgne, About this project. Download from kervelo-bike com "Kirkstarter" program. circa May 2016.

\* cited by examiner

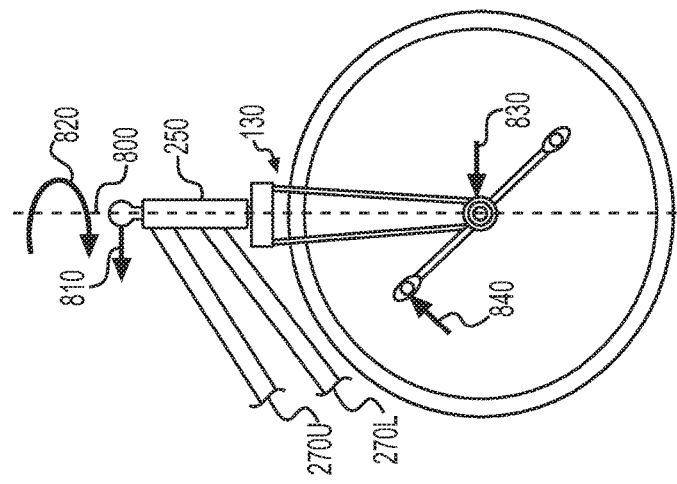
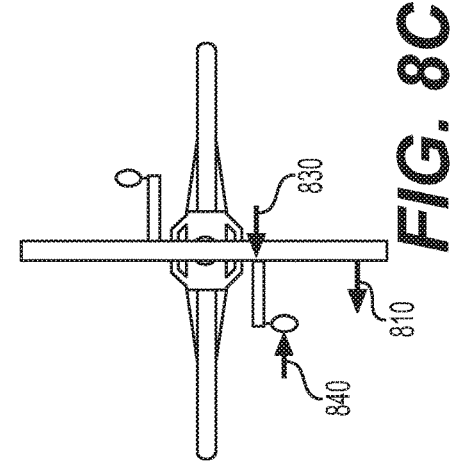

RECUMBENT BICYCLE AND METHODS OF RIDING EMPLOYING SUPPLEMENTAL UPPER BODY POWER, ENHANCED AERODYNAMICS, STABILITY, AND CONTROL

CROSS-REFERENCE TO RELATED APPLICATIONS

This non-provisional patent application claims the benefit of and priority to U.S. Provisional Patent Application No. 62/614,701 filed Jan. 8, 2018 and U.S. Provisional Patent Application No. 62/741,196 filed Oct. 4, 2018, both of which are incorporated herein by reference in their entirety.

BACKGROUND OF THE INVENTION

Field of the Invention

Recumbent bicycle, particularly with propulsion by both hand and foot power.

Background Art

The following is a tabulation of some prior art that presently appears relevant:

| Patent Number | Issue Date | Patentee |
| --- | --- | --- |
| US Patents | | |
| 2,505,464 | 1950 | Debuit |
| 6,419,254 B1 | 2002 | Langen |
| 7,246,809 | 2007 | Rutkowski |
| 7,311,321 B2, | 2007 | Rutkowski |
| 3,910,599 | 1975 | Thomas |
| 4,270,766 | 1981 | Thomas |
| 4,303,255 | 1981 | Thomas |
| 7,753,388 | 2010 | Tolhurst |
| 9,139,254 B2 | 2015 | Garnet |
| Foreign Patent | | |
| DE 19736266A1 | 1999 | Kretschmer |

Non-Patent References

Thomas Kretschmer, "Direct Drive (Chainless) Recumbent Bicycles", "Human Power" Issue 49, 1999-2000.
John Stegman, "Chain of Thought", "Velo Vision", December 2002.
Jeremy Garnet, velotegra.com/wordpress1, Technical Paper, "Ergonomics of Direct-Drive Recumbent Bicycles", undated.
Marc Le Borgne/Kervelo, kervelo-bike.com, "Kickstarter" Program April-May 2016.

The history of bicycle development shows there is an ongoing need for improvements which increase the power the rider can apply, particularly for acceleration and climbing hills, and which increase efficiency, speed, comfort, and safety. Better bikes could be used by more people for transportation, recreation, fitness and sport.

Baron Karl von Draise is generally credited with the first bicycle in 1817. It had a steerable front wheel for balance and directional control, a rear wheel, a seat and a connecting frame. The upright rider provided propulsion by pushing their feet directly against the ground.

The next generation fixed a crankshaft and pedals to the front wheel for improved propulsion. As lighter bicycles developed, wheel diameter was increased for higher speeds. To minimize the pedaling forces that were fed back to the rider and so that the wheel did not hit the riders legs when steering, the seat needed to be approximately in line with the steering axis and above the wheel. The high seat and pedal position was dangerous as the rider could easily be thrown forward and off the bicycle.

The conventional upright configuration, which is still in use today, emerged circa 1885. A roller chain and sprocket ratio was used to power the rear wheel. Rear Wheel Drive (RWD) separated the bicycle steering and propulsion functions thereby preventing any Pedal Force Feedback (PFF). The rider was in an improved position between wheels of a convenient and equal size. Importantly, this configuration also allowed the rider to safely stand on the pedals to accelerate and climb hills. These improvements resulted in a first, "Golden Age of Bicycles." However, there are still fundamental problems with this bicycle configuration. The seat is still elevated, which can cause a dangerous fall and can be uncomfortable. The rider position is also poor aerodynamically which results in reduced efficiency and speed.

Commercial development of alternative bicycle concepts has been impeded by a Union Cycliste International (UCI) ruling in the 1930's. This sanctioning body prohibited the use of everything in official racing except the upright bicycle configuration. The ruling was apparently to emphasize human performance over bicycle technical innovation.

Recumbent bicycles nonetheless have been developed. The best alternative configurations can provide improved comfort, safety or aerodynamics. However, none allow the rider to stand and pedal to provide the additional upper body/hand power that can be generated on an upright bike.

Another inherent problem with the recumbent bike is interference between the pedals and the front wheel, as the natural position for both is low and forward. Attempts to resolve this conflict have resulted in Long Wheel Base (LWB), Short Wheel Base (SWB), and Compact Long Wheel Base (CLWB) configurations. The LWB puts the pedal crankshaft assembly behind what is usually a small front wheel. The resulting long wheelbase can cause poor low speed handling, be hard to transport and store, and can be heavy. The small front wheel results in increased rolling resistance, less ability to roll over obstacles, poor wear life, logistics and aesthetics. A SWB is achieved by locating the pedals above, rather than behind, a small front wheel. This configuration can be hard and dangerous to learn to ride because the elevated pedal position makes it difficult to put a foot on the ground when necessary. The CLWB uses two full size wheels but the rider position problem is more severe because the pedals are higher yet. Additionally, these alternative configurations must transmit power the significant distance from the pedals to the rear wheel. This mechanism, which is usually a long chain with guides, is often heavy, greasy, dirty, claims space, and for efficient pedaling requires a bike frame structure which is heavy enough to resist chain line tension without significant flexing.

Front Wheel Drive (FWD) recumbent bicycles have also been developed. Alternative configurations have the pedal crankshaft assembly mounted either on the bicycle main frame or mounted on the fork. These mounting positions can be either inside or outside the front wheel perimeter. Mounting the crankshaft on the frame prevents PFF but complicates power delivery to the steerable front wheel. Configurations that mount the crankshaft on the fork are subject to PFF.

Mounting the crankshaft on the frame outside the front wheel perimeter is a configuration often used by current racing recumbents. Drive is typically by a chain that must twist as the front wheel is steered. This requires supplemental mechanism to guide the chain, limits the range of steering and the chain is prone to coming off the sprockets. Additionally, the crankshaft is usually mounted in a high position, over and ahead of what is often a small front wheel.

Mounting the crankshaft on the frame inside the front wheel perimeter is shown in the Debuit, Langen and Rutkowski patents. The supplemental structure and mechanism required in this configuration adds complexity, weight, cost and limits the range of steering. It can also require excessive width between the pedal centerlines which can result in rider discomfort.

Mounting the crankshaft on the fork and outside the front wheel perimeter is shown in the Tolhurst patent. This bike has been commercially produced. It is known as a Moving Bottom Bracket (MBB) configuration. Here, importantly, PFF is reduced by the crankshaft offset which is the distance that the crankshaft is mounted ahead of the steering axis. The MBB configuration can be difficult and potentially dangerous to learn to ride because of the high crank position, the need to shift laterally as the crankshaft moves through the steering arc, particularly at low speed, and the need to control residual PFF.

When the crankshaft is mounted on the front fork and inside the front wheel perimeter it can also serve as the front axle. Examples of this "coaxial" or "concentric" configuration are shown by the Kretschmer patent and in successive non-patent references by Kretschmer, Stegman, Garnet and Le Borgne. Each of these examples strive to minimize PFF and they each do it a bit differently. Kretschmer aligns the steering axis toward the rider and uses a spring type fork centering system to mitigate resulting bike handling problems. Stegman, Garnet and Le Borgne each use crankshaft offset from the steering axis; Garnet maximizes that offset and also uses a spring to improve handling. None show front fork structure able to resist significant torsional loads.

Notably, each also strongly advocated for use of a chainless front wheel hub transmission system of a sort described in the Non Patent References and in the Garnet Patent. Likely due to this focus, there are no reports that Kretschmer, Stegman or Garnet were able to build multispeed coaxial bicycle prototypes. It would be difficult to evolve and refine the basic coaxial bicycle configuration to a level of high performance without extensive developmental test and evaluation of successive prototypes equipped with some sort of effective multispeed transmission.

Le Borgne, most recently, was able to adapt a conventional bicycle bottom bracket transmission system into a front wheel hub configuration. However, that adaptation did not provide the gear ratios needed to pedal the bike at a high ground speed and it used a single blade cantilever type front fork that did not adequately resist torsional pedal loads about the steering axis. Le Borgne also used a recumbent specific handlebar that lacked rigidity. Again, development of a high performance bicycle configuration could not be expected with these gearing and structure problems.

It is important to note that none of the fork assemblies disclosed by prior art were built with structure adequate to withstand the levels of torsion that must be transmitted for high performance methods of use. As will be discussed, this is because the necessary bike configuration, structure, methods of use and the associated level of torsion produced are not at all obvious.

The prior art has also shown hand and foot powered recumbent bicycles of various configurations. The three patents by Thomas show coaxial FWD pedal recumbents that allow supplemental hand power application through a hand crank system. Thomas offset the hand and foot crank positions to minimize PFF. Problematically, the hand crank structure and mechanism adds weight, complexity and cost. It also appears to be difficult to hand crank, steer and otherwise control the bike. The effectiveness of this mechanism is further compromised because hand power is usually needed only intermittently, typically for acceleration and climbing, but the burden is continuous.

A variety of aerodynamic bicycle fairings are known. Kretschmer and Stegman both show front fork mounted fairings. They can allow more efficient and higher speed biking. However in windy conditions they can be unstable, hard to control and dangerous. Adequate guidance in the prior art on how a fork mounted bicycle fairing should be configured for stability in extreme windy conditions has not been found. Similarly, methods to effectively control that fairing while riding a coaxial FWD bicycle have not been found.

My invention resolves the deficiencies outlined above to provide a better bike which can be used by more people.

BRIEF SUMMARY OF THE INVENTION

Disclosed is a recumbent bicycle that allows the seated rider to effectively apply upper body power, also called hand power, through the handlebars to supplement pedal input. The rider can use hand pressure to urge pivot of the crankshaft about the steering axis in coordinated opposition to pedal forces for an increase in torque applied to the crankshaft. The rider can also actually displace the crankshaft while simultaneously pedaling, which is an application of hand work. Both of which add hand power. Methods of riding include using only foot pedal input, adding supplemental hand force, and adding both hand force and displacement, or work input.

The bicycle configuration has front wheel drive, front wheel steering, and a fork mounted crankset. The crankshaft can be coaxial with the front wheel and the crankshaft centerline is on or near the steering axis. To efficiently apply hand power, the front fork assembly is rigid in torsion to the opposed forces of the riders hand and foot input. This rigidity extends from the handlebar grips to the crankshaft endpoints at which the crank arms are attached.

A key prior art objective has been to minimize or eliminate Pedal Force Feedback (PFF). Here, conversely, the pedal steering interaction mechanism for PFF is employed to allow supplemental hand propulsion.

The prior art uses crankshaft offset from the steering axis to reduce PFF. Here, it is not used because it also prevents hand power application. Instead, extended trail is used to manage PFF. Trail allows hand power input at lower bicycle ground speeds, where it is particularly important for acceleration and climbing, and increasingly controls PFF as the bicycle increases to cruising speed. Extended trail also allows stable and responsive handling of this FWD bicycle.

The embodiment can effectively use aerodynamic fairings. The front fairing is fork mounted. For stability the front fairing aerodynamic center of presented area is located ahead of the steering axis. The hand and foot inputs typical of riding this bicycle allow effective control of the faired bike. That control can be enhanced by a method of light braking while pedaling.

Seating is safe, comfortable and aerodynamic. The seat is at a safe chair-like height. The riders feet are reassuringly low and are forward to better prevent falling and protect the rider in case of a collision. This configuration makes the bike easy to start, to stop, and to learn to ride. The rider is more in than on the bike and is balanced between two full and equal size wheels. Riders vision is forward, up and at car eye level.

The result is a long sought capability comparable to standing to pedal a conventional upright bicycle while increasing rider safety, efficiency, comfort and aerodynamics. I believe this is a fresh, elegant and integrated solution to long standing problems that have previously been addressed with questionable success.

DRAWINGS—FIGURES

In the drawings, closely related figures have the same number but different alphabetic suffixes. The drawings are for exemplary illustration and to aid description, they are not for purposes of limiting the invention.

FIG. 8A is a front view, functional representation of the embodiment.

FIG. 8B is the right side view of the front part of the embodiment showing hand force application to the handlebar being conveyed by the fork to the crankset, this force urging crankshaft pivot and endpoint translation, in opposition to the foot force which is causing crankshaft rotation.

FIG. 8C is the top view.

DRAWINGS—REFERENCE NUMERALS

Figure 9C:
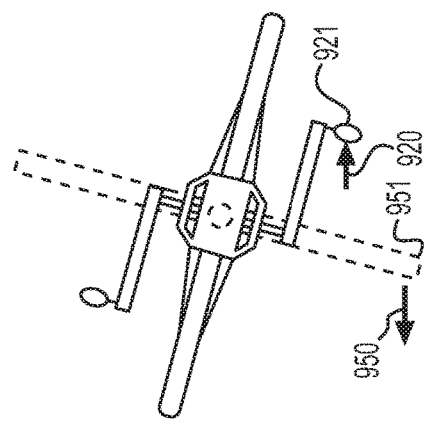
FIG. 9C shows the position where the right foot power input is ending and the left foot power input is beginning from a top view.
Figure 9B:
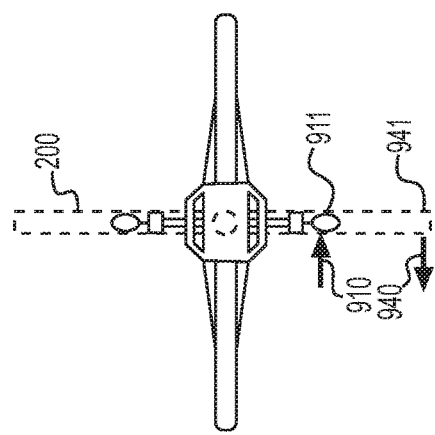
FIG. 9B shows the intermediate position from a top view.
Figure 9D:
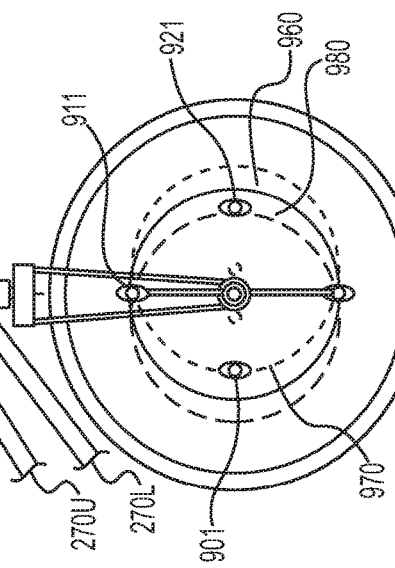
FIG. 9D shows from a right side view the resulting reduced perimeter distance followed by the riders foot with respect to the perimeter followed by the crank arm radius.
Figure 9A:
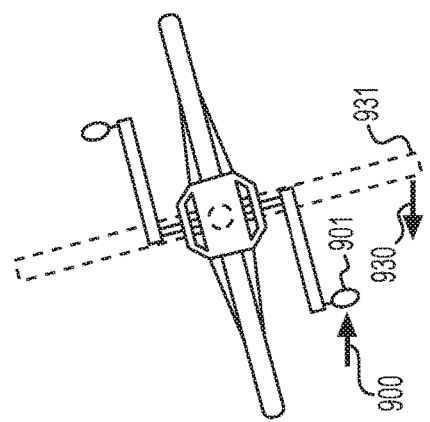
FIG. 9A shows from a top view and a right foot input starting position how hand force input and deflection of the handlebar causes crankshaft pivot and endpoint translation, in coordinated opposition to pedal input; this adds hand power to the crankshaft by increasing torque and by reducing the perimeter distance traveled by the riders foot in the direction of pedal force application.

The following list of numbers and names is provided as a convenient reference.
100 crankset assembly
110 front wheel assembly
120 power transmission assembly
121 cassette
130 front fork assembly
140 seat assembly
150 rear wheel assembly
160 frame assembly
161 trail
200 handlebar
205R right rear view mirror
205L left rear view mirror
210R right hand grip
210L left hand grip
215 stem
220R right brake lever
220L left brake lever
230F front brake
230R rear brake
240R right pedal
240L left pedal
242R right crank arm
242L left crank arm
244 upper seat back
246 mid seat back
248 lower seat
250 head tube
260L lower headset bearing
260U upper headset bearing
270U upper down tube
270L lower down tube
280 secondary drive
290 frame main rail
295 rear fork
297 rear wheel connection
300 double triangulated torque tube fork
310 steerer tube
320 headset bearing seat
330 fork crown
340RR fork blade right rear
340LR fork blade left rear
340LF fork blade left front
340RF fork blade right front
350R right crankshaft bearing clamp
350L left crankshaft bearing clamp
360 tire clearance dimple
400 crankshaft
410 boxed fork crown
420 sprocket
425 chain
500 spoke front wheel hub
510 left side drive freewheel
520 outer left side wheel bearing
530 inner left side wheel bearing
600 wheel hub
610 left side threaded bearing support insert with wheel bearings
620 right side bearing support insert with wheel bearing
630 washer
700 front fairing assembly
710 front fairing upper
720 front fairing lower
730 rear fairing
740 aerodynamic center of presented area
800 steering axis
810 right hand pull
820 torque about steering axis due to right hand pull
830 pivot force on crankshaft
840 right foot force
900 right foot force
901 right foot pedal position
910 right foot force
911 right foot pedal position
920 right foot force
921 right foot pedal position
930 right hand pull force 931 right handgrip position
940 right hand pull force
941 right handgrip position
950 right hand pull force
951 right handgrip position
960 pedal perimeter path with front wheel pointed forward as in FIG. 9B
970 pedal perimeter path with front wheel angled 15 degrees left as in FIG. 9A
980 pedal perimeter path with front wheel angled 15 degrees right as in FIG. 9c

DETAILED DESCRIPTION

The following paragraphs and associated figures discuss the embodiment first in terms of physical configuration and how it is made, then in terms of operation and function. The discussion considers the overall bicycle and then important elements.

Materials and methods of making the embodiments are typical of those used for currently available bicycles and are well known. Except as noted, commonly available bicycle parts are used. Although the embodiment illustrated is made primarily of welded, brazed and/or machined steel and aluminum, the full range of materials typically used for bicycles, which also include titanium and advanced fiber-epoxy-composites of carbon, fiberglass and/or kevlar, could be used. Any information necessary to understand, build or use the embodiment, beyond that of standard practice is disclosed.

Overall Bicycle

Figure 1:
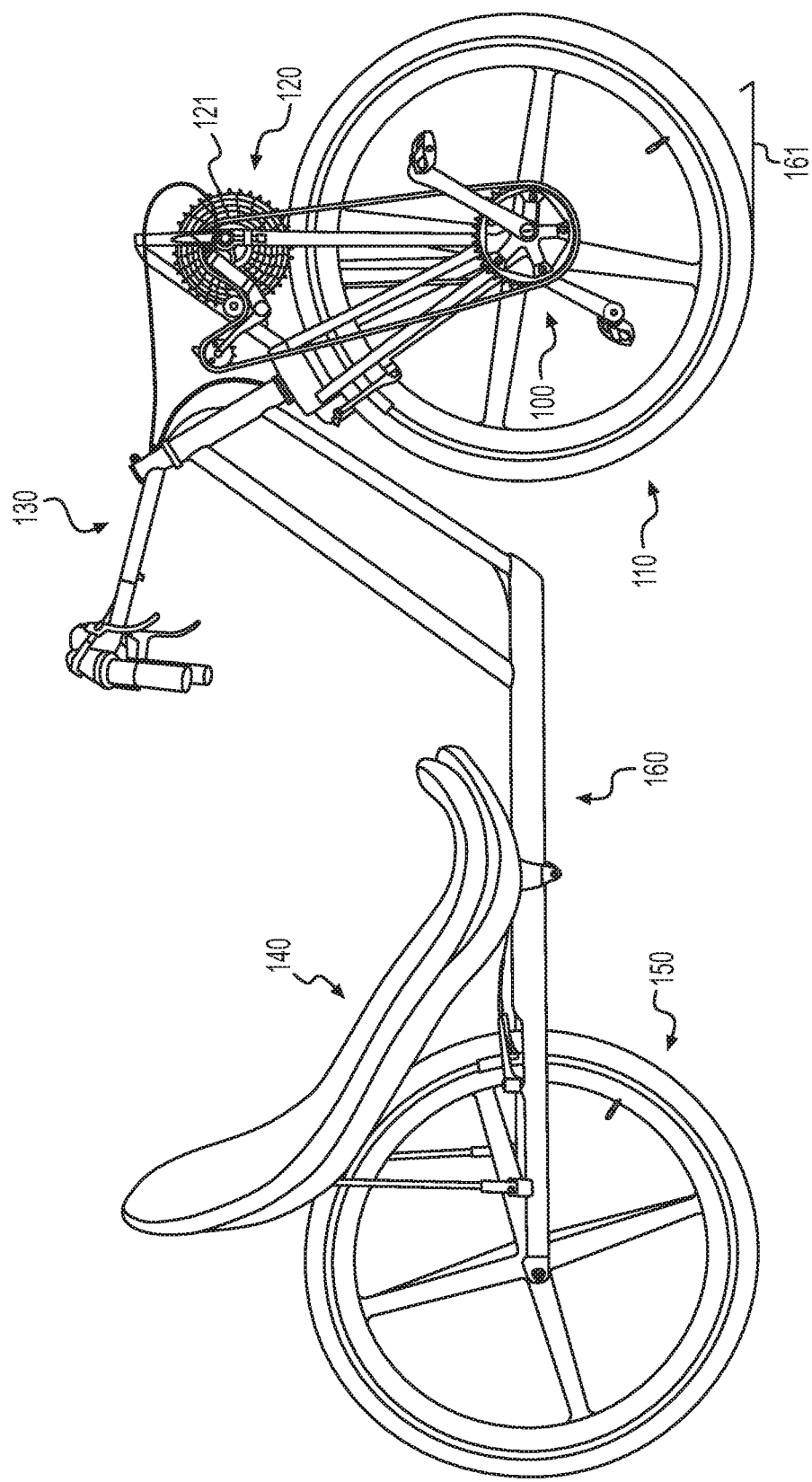
FIG. 1 shows a right side view of an embodiment.
Figure 2:
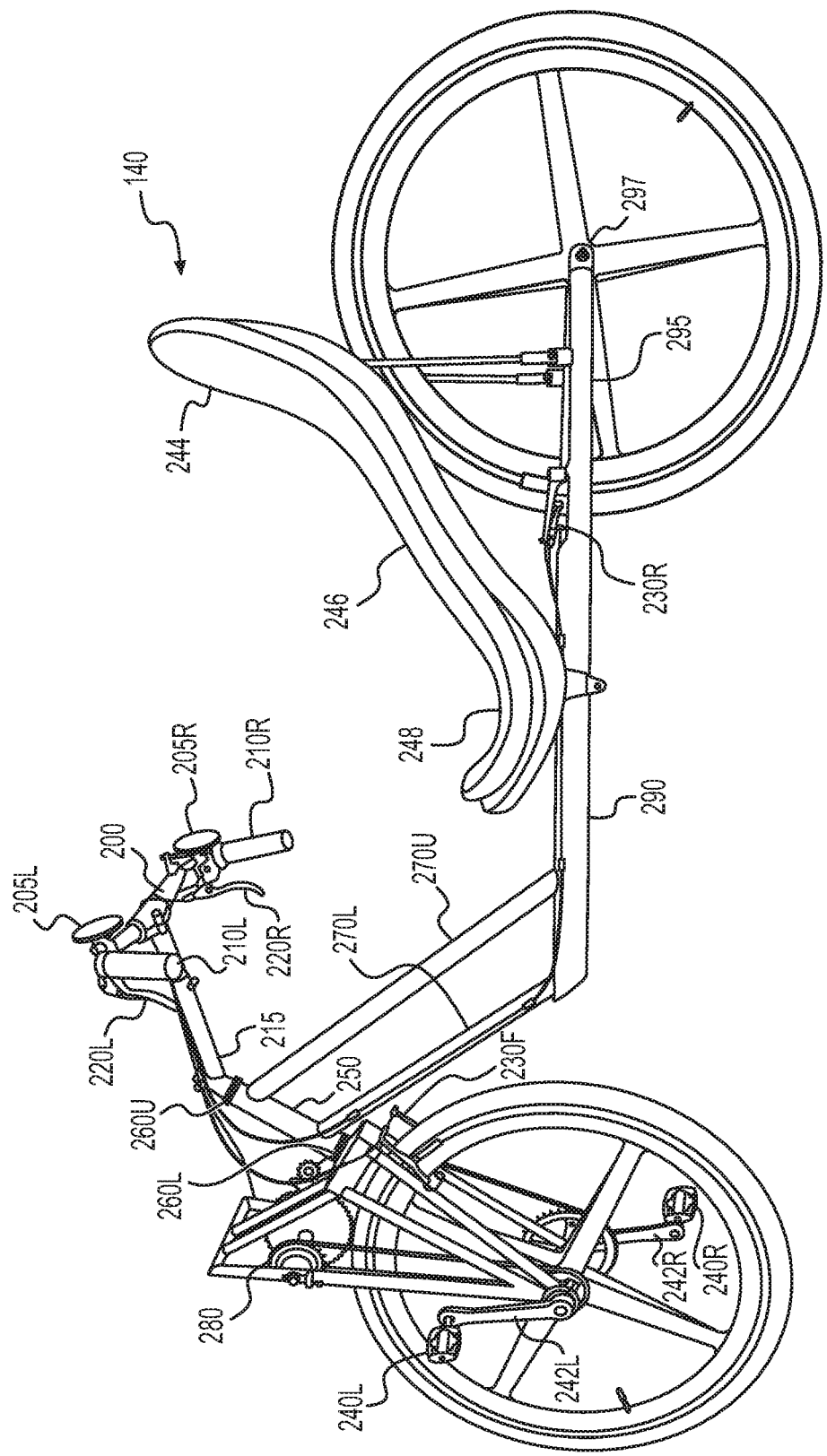
FIG. 2 shows a left side view of an embodiment.

A right and left side view of the embodiment is shown in FIGS. 1 and 2. Assemblies shown on FIG. 1 include a pedal crankset 100, front wheel 110, power transmission 120, front fork 130, seat 140, rear wheel 150, and frame 160.

The embodiment is a recumbent bicycle that has front wheel drive and steering. The wheelbase is 60 inches, the steering axis angle is 60 degrees off the surface, trail 161 is 7.8 inches and the weight is about 33 pounds. The embodiment shown is fitted to a rider 75 inches tall.

Front Fork

The entire front fork assembly is best shown in FIG. 2. The fork assembly includes the handlebar 200 a standard grip 210L for the left hand, a right hand twist-grip type derailleur shifter 210R, standard brake levers 220L, 220R, actuation cables and housings, rear view mirrors 205L, 205R, and stem 215. The fork is connected to the main frame through the headset bearings 260U, 260L which are fitted to the frame head tube 250. The crankset, front wheel and the power transmission are each mounted on the fork.

Conventional upright bicycle handlebars 200 are used because they are designed to accommodate the loads exerted by a rider while standing to pedal whereas recumbent bicycle handlebars are not. The embodiment bars are 18 inches wide at the hand grip center points. The handlebar position with respect to the rider allows effective use of small rear view mirrors 205L, 205R without the need for extensions and their associated aerodynamic drag. The handlebars and top of the seat back are both at an appropriate height to mount front and rear lights for visibility. These heights are consistent with the bar and seat post heights at which lights are mounted on conventional upright bicycles.

The stem 215 used in this embodiment connects the handlebars to the steerer tube. Standard bolted clamp type connections are used at both ends. The stem main body uses telescoping sections, also with a standard bolted clamp connection, so that the handlebar reach can be easily adjusted. This arrangement is typical of what is often used at the rear "stoker" position for conventional upright tandem bicycles. The stem, as shown, is 10.5 inches long.

Figure 3:
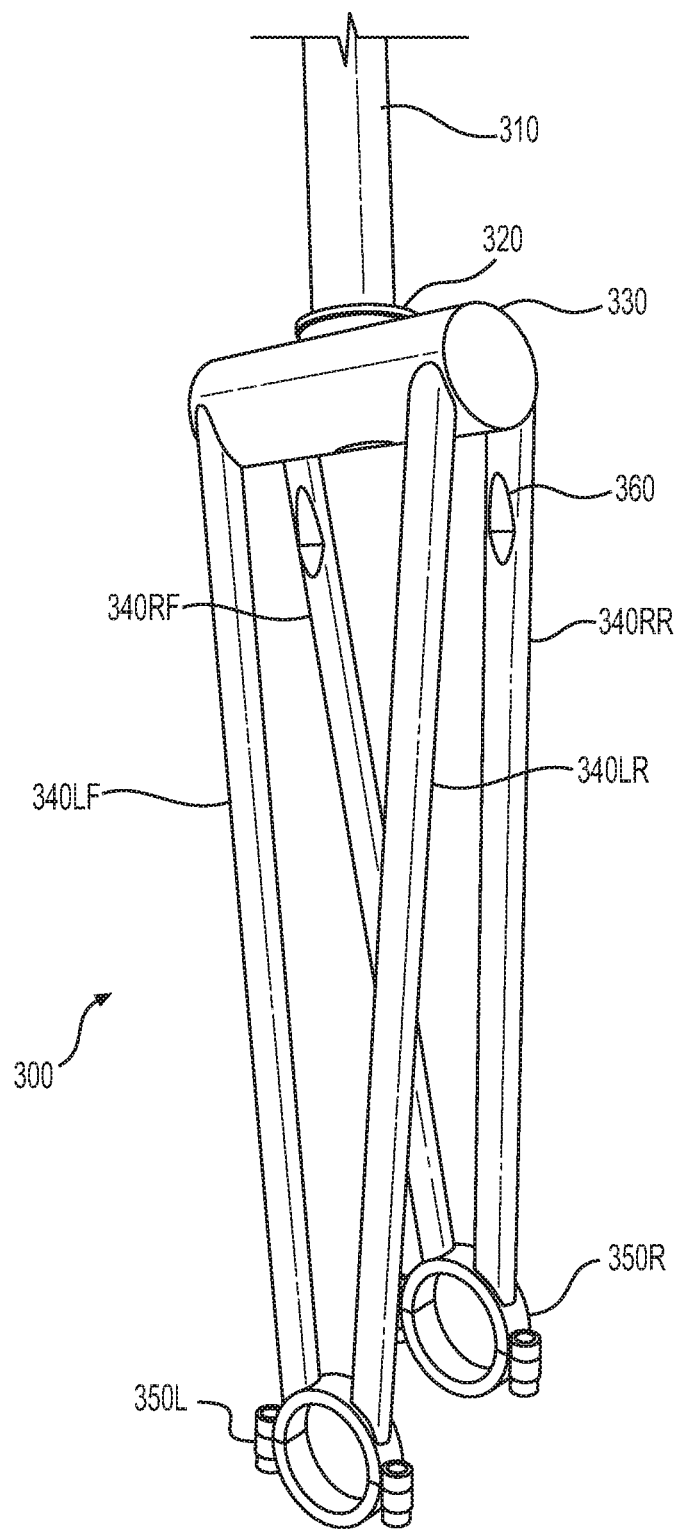
FIG. 3 shows an embodiment of the double triangulated torque tube fork.

FIG. 3 shows an embodiment of the double triangulated torque tube fork 300. This fork is a means for transmitting torque from the handlebars and stem to the crankset. This fork structure includes the right and left crankshaft bearings clamps 350R and 350L, left front 340LF, right front 340RF, left rear 340LR, and right rear 340RR fork blades, fork crown 330, headset bearing seat 320, and the steerer tube 310. The following detailed description of the steerer tube, crown structure and overall fork configuration is provided because they are not typical of other bikes.

The steerer tube is made of 4130 alloy steel 1.125" OD by 0.095" wall thickness; this was further reinforced with a 4130 steel insert of 0.930 OD and 0.750 ID welded inside the lower steerer tube and extending 6" up from the bottom of the crown. The fork tube extends through and is rigidly attached to the crown by welding at the crown top and bottom.

Figure 4:
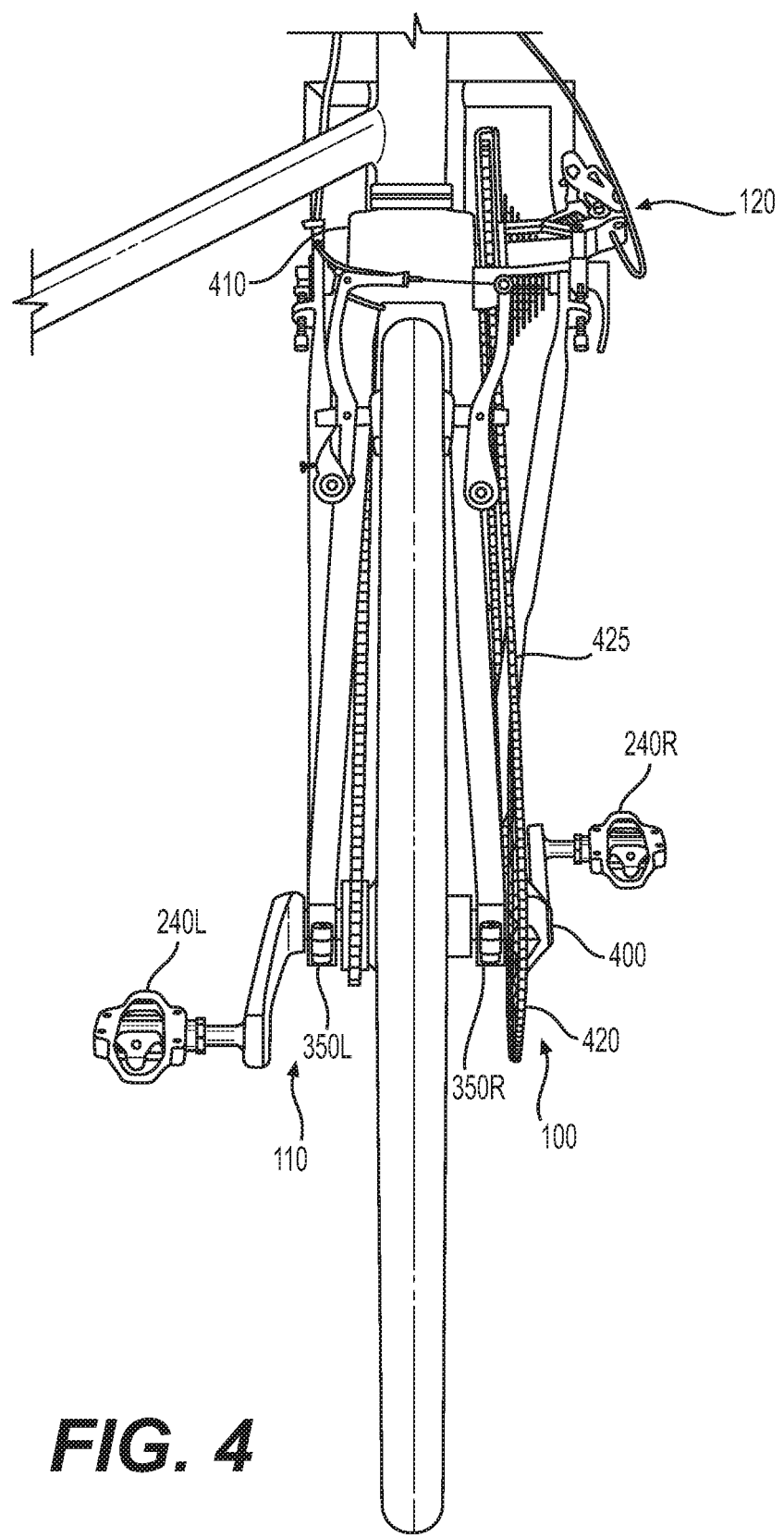
FIG. 4 shows the fork from the rear as assembled on an embodiment.

The fork crown as shown in FIG. 3 was made from a 2" OD by 0.049 inch wall thickness 4130 steel tube, 4" long. The tube was bent by simple compression to a dimension of about 1.5" high by 2.5" wide. As best shown in FIG. 4, the crown 410 was then reinforced by welding 0.049" 4130 steel sheet to box the upper surface and to cap both ends. A second curved layer of 0.049" sheet was also welded to overlay and reinforce the lower surface of the crown. This fork crown description is intended to illustrate a working solution. Alternative constructions of the basic configuration are possible.

The fork crown length, along the bicycle length, is extended to approximately the same distance as the width across the two crankshaft bearing clamps. The crown width is limited to that needed for tire clearance. The fork blades are dimpled FIG. 3, 360 for improved tire clearance. The steerer tube is attached at the crown center point and, in this case, is perpendicular to the crown.

The four fork blades connecting the crown and crankset bearing clamps are 0.625" OD×0.035" wall 4130 steel. The two left side fork blades 340LF, 340LR extend from the ends of the crown at a converging angle in the plane of the front wheel and connect to the left crankshaft bearing clamp 350L. Similarly, the right two fork blades connect the right side. The front left 340LF and right side 340RF blades extend at a diverging angle, in a plane perpendicular to the front wheel, from the crown to the clamp connections 350L, 350R. The rear left and right side blades similarly connect to the clamps from the rear. Clamping the crankset into place creates a rigid connection between the right and left clamps, opposite and at 90 degrees to the crown. The assembly creates what is effectively a torque tube structure. The steerer tube 310 which is rigidly attached to the crown 330 continues this torque tube to the stem connection.

This steerer tube, fork crown, and overall assembly have proven to be sufficiently rigid to withstand the bending and torsion loads induced by high performance riding. This is an embodiment of the double triangulated torque tube fork.

Crankset

As best shown in FIG. 1, the crankset 100 is mounted so that it is concentric with the front wheel axis of rotation. A single shaft serves both as the front wheel axle and the crankshaft.

With reference to FIG. 4, the pedal crankset assembly includes a crankshaft 400 (located within the assembly shown), crankshaft bearings within the clamps 350R and 350L, a left crank arm 242L, a right crank arm 242R and sprocket, left 240L and right pedals 240R. The pedal centerlines are 11 inches apart measured parallel to the crankshaft. The crankset is attached to the front fork by the crankset bearing clamps. To improve chain retention, the sprocket 420 can be of the type used with conventional mountain bikes that do not use a front derailleur (i.e. a "one-by" drive train).

Figure 5:
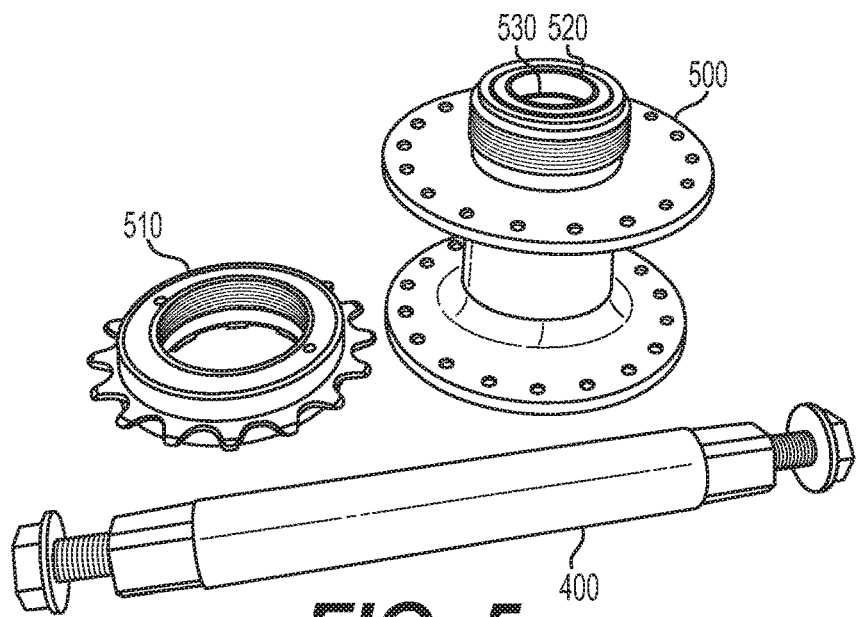
FIG. 5 shows an example front wheel hub, with left side bearings, freewheel, crankshaft, and pedal crank arm attachment bolts.

FIG. 5 shows the crankshaft 400 with common squared connections and bolts for the crank arms. The crankshaft bearings, also called "bottom bracket" bearings, although not shown, are common industrial ball bearings. They are located on the crankshaft just inboard of the crank arm connection points. To avoid bicycle handling disturbances when pedal power is applied, the crankshaft bearings should be a press fit onto the crankshaft. Additionally, the crankshaft bearings were pressed into simple, concentric aluminum spacers (not shown) to conveniently adapt the bearing outside diameter to the clamp inside diameter.

Wheels and Brakes

The front wheel hub 500 shown in FIG. 5 is for use with a conventional spoke rim (not shown). These more common spoke wheels could be used instead of the wheels shown on the embodiment. The front wheel means for independent rotation around the crankshaft consists of conventional bearings in the wheel hub and use of the crankshaft as the front wheel axle. Common ball bearings are pressed into the hub and the crankshaft is pressed into the bearings. Tubular spacers on the crankshaft between the bearings (not shown) are used to control alignment and to aid in future service.

The freewheel 510 shown is of a conventional type that is threaded onto the hub. It is a commercially available left-hand drive configuration. Note that the left side wheel hub bearings 520, 530 are located within the diameter of the threaded freewheel attachment and are of a relatively large inside and small outside diameter. For ready availability, it was necessary to use metric (17 mm) sized components. For adequate bearing life, two of these bearings were used adjacent to one another.

Figure 6:
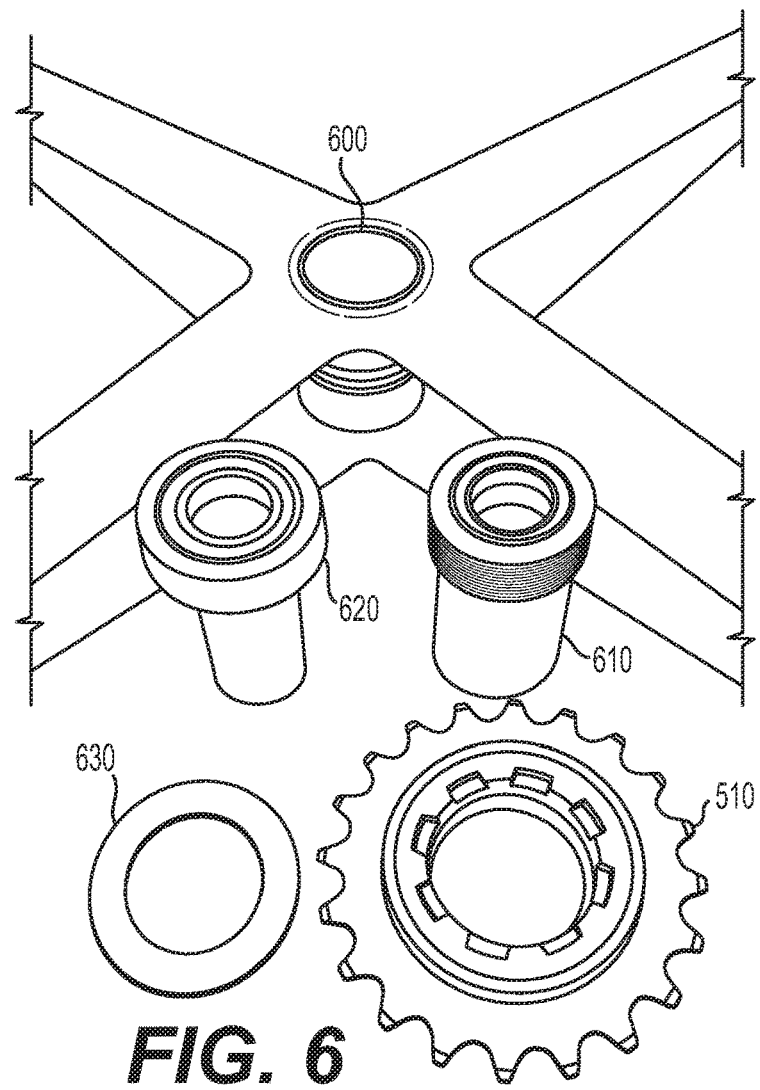
FIG. 6 shows elements of the front wheel hub used on the embodiment.

FIG. 6 shows the front wheel hub parts that were actually used on the embodiment. It is an adaptation of a commercial high performance aerodynamic wheel of carbon fiber composite and aluminum construction. The wheel was originally intended for use as a conventional bicycle rear wheel. The hub 600 was machined for bearing support inserts 610, 620. The left side 610 uses bearings and freewheel as described above. A single, less expensive, larger outside diameter bearing is used on the right side 620. The left and right side bearing supports were machined to telescope together and into the wheel 600. In this assembly, the washer 630 shown was placed between the freewheel threaded element 610 and the wheel. Standard commercial adhesive was used to join these elements together and into the wheel.

The front and rear wheel and tire assemblies are both 700c×32 mm. Other sizes can be used. A front wheel, axle and skewer assembly for a conventional upright bicycle is used as the embodiment rear wheel and is attached to the frame within the rear fork assembly. Conventional linear pull brakes 230F, 230R are used for the front and rear wheel.

Power Transmission

FIGS. 1, 2 and 4 show the power transmission system 120 used for this embodiment. The power transmission, along with elements of the crankset 100 and front wheel 110 assemblies, provide means for transmitting rotational power from the pedal crankset to the front wheel. Although this specific implementation is unique, there is similar prior art and alternative embodiments are possible.

The embodiment uses a typical right side crank arm, sprocket 420 and chain 425, an eleven speed cassette 121 and derailleur, a secondary shaft with output sprocket 280, chain, and a free wheel sprocket 510. Support structure and a simple threaded tension adjustment system for the secondary chain is also included.

The secondary shaft and bearings are a rear wheel hub and axle assembly for a standard disc brake equipped upright bicycle. The freewheel included in that hub, is not necessary but does not cause a problem. The input sprockets 121 ("cassette") are attached using standard hardware. The output sprocket is bolted to the hub, via use of a simple adapter, in place of the disk brake. The 11 speed system has a 38 tooth sprocket 420 and a 10 by 42 cassette 121. The secondary drive 280 is 20×16. The resulting range is 32 to 128 gear inches.

Frame and Seat

Referring to FIG. 2, the frame supports the seat and rear wheel assemblies. The frame includes a head tube 250 with upper 260U and lower headset bearings 260L that receive the front fork steerer tube 310 such that a front wheel steering axis is created about which the front fork assembly is free to pivot with respect to the frame. The steering axis is an imaginary line concentric with the steerer tube and head tube. As is conventional practice, the headset bearings also support thrust loads along the steering axis.

The rider's upper body is supported by the seat assembly 140. The seat is molded of carbon fiber and epoxy resin. As is common practice, the seat is shown in each figure with a cushion for added comfort. The upper portion of the seat back 244 is in a position substantially parallel to the steering axis to allow more effective hand power input. The mid section of the seatback 246 is much more reclined, and along with the lower seat 248, supports most of the riders weight.

The frame also includes down tubes 270U, 270L, main rail 290, rear fork 295 and rear wheel dropouts/attachment 297 points. The frame has typical provisions for mounting the seat, brakes, fairings and other accessories. The seat assembly attaches to the frame at the seat bottom using a conventional bracket. Typical seat back supports are also used.

Fairing

Figure 7:
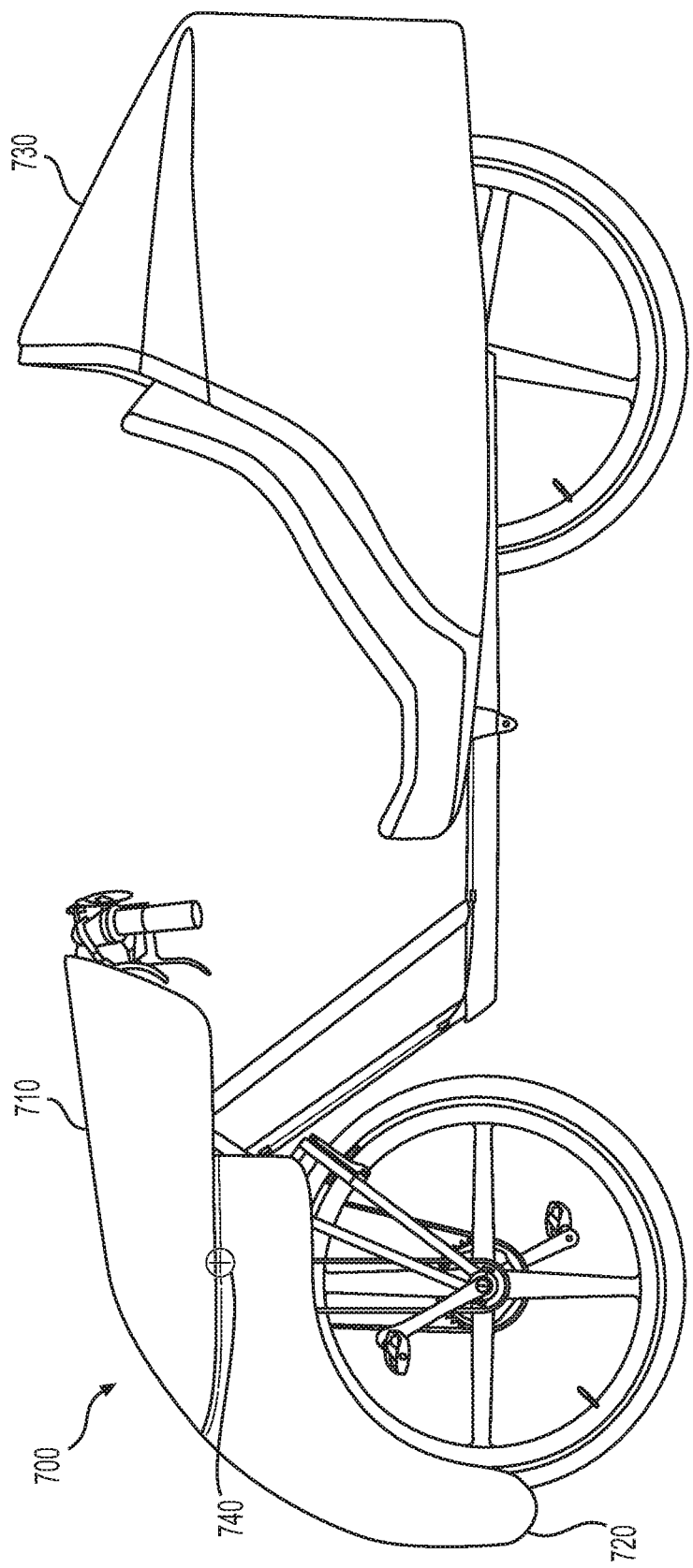
FIG. 7 shows the embodiment with a front fairing having an aerodynamic center of presented area ahead of the steering axis and having a rear fairing.

The fairing system is shown in FIG. 7. A two part front fairing assembly 700, and a rear fairing 730 are shown. The front fairing is made in an upper 710 and lower 720 section. The lower section is bolted, using an internal bracket (not shown), to the front fork structure. The upper section rests on the lower and is taped into place. Both parts were carved from lightweight insulating foam, primed and painted with latex paint. The single piece rear fairing 730 is of similar construction and is bolted to the rear fork.

For stability, the fairing and mounting allows the embodiment to be self correcting when subjected to a cross wind gust. This is achieved by mounting the front fairing 700 on the front fork and shaping the fairing such that the aerodynamic center of presented area 740 is in front of the steering axis line. This center is determined by the presented area of the fairing from the direction of the wind and to a lesser extent by the coefficient of drag in the direction of that wind. In practice, the presented area is the primary consideration.

Operation

The application of supplemental upper body power enabled by the embodiment is similar to that of standing to pedal a conventional upright bicycle. To better understand how this embodiment works, the upright bike process is first reviewed.

Upright bike power is input to the crankshaft in a variety of ways. First, the seated rider can pedal normally and their body weight serves as the reaction against pedal force application. As they pedal harder, force is increased until at some point they lift off the seat and are standing to use all their weight in reaction to the pedal force. To pedal harder yet, the rider can pull against the handlebars. This provides necessary reaction to the leg force and allows the rider to apply upper body strength as supplemental pedal force input. For maximum hand power the rider uses additional upper body input to pivot the bike to the right and left. The bike pivots on the tire-to-ground contact points and this pivot is in coordinated opposition to each pedal stroke. Each pivot of the bike results in a displacement of the crankshaft end against the direction of pedal force application. This is a mechanism for doing useful work. The hand work input fraction is in direct proportion to the crankshaft endpoint translation distance and the pedal circle diameter. This translation effectively reduces the perimeter distance the riders foot travels in the direction of pedal force application.

The process of supplemental hand power utilized by this embodiment is similar except the rider uses upper body input against the handlebars to add force and to pivot the fork assembly and crankset about the steering axis, as opposed to the upright rider pivoting the entire bike against the tire-to-ground contact points.

This hand power is applied as a force, or a force and displacement, directly against the handlebar. Reaction by the frame headset bearings creates torque, or torque and rotation, of the fork assembly about the steering axis. This in turn results in a force, or a force and translation of the crankshaft endpoints in opposition to foot forces which are causing crankshaft rotation. The hand and foot forces are cumulative, as are the hand induced translation and foot induced rotation.

The embodiment thus resolves a key problem with recumbent bicycles. Hand force and work can effectively be applied to supplement foot pedal propulsion. This is in a manner comparable to that of standing to pedal a conventional upright bicycle.

Method of Riding

A cyclist can learn to ride the embodiment almost immediately. For most riding, a normal cadence and pedal stroke makes it easy to hold the embodiment on a steady path. Pedal force inputs to the steering are easily managed, although insufficient hand pressure application will allow handlebar displacement that reduces pedal input efficiency, just as application of excess hand pressure can increase input power.

As with a normal recumbent, pedal cadence and leg force input can increase for more pedal power input. However, unlike existing recumbents, the embodiment allows additional power to be applied by exerting hand force on the handlebar to rhythmically add force to the leg stroke. Maximum power is generated by the rider using additional hand force in this rhythmic process to actually rotate the fork assembly into each pedal stroke. Depending on ground speed, steering displacement angles up to about plus and minus 15 degrees are practical. These angles are similar to the tilt or roll angles used when a standing rider pivots an upright bike.

The rider's arms and legs are reacting against each other through the torques created about the steering axis. The right arm pulls while the right leg pushes, and then the left arm pulls while the left leg pushes. Ergonomically, this is a satisfying and effective motion. More power can be generated than if the arms and legs were not reacting against each other. Metabolically, the use of large upper and lower body muscles groups together may provide significant aerobic as well as anaerobic benefit. Mechanically, this is a very efficient motion as it decreases the necessary reaction by the bike structure against the riders body thereby reducing flexure losses.

The most challenging aspect of riding the embodiment is trying to turn sharply while pedaling at very low ground speed. This requires a large steering deflection that both moves the outside pedal beyond the riders leg reach and can cause the front tire to contact that extended leg. The simple solution is to minimize the turn angle until sufficient speed is achieved to coast through the sharp portion of the turn. Coasting allows the rider to return the outside pedal and bend that leg to clear the turned wheel. This process is quickly learned and executed, just as the rider of a conventional bike learns they must keep the inner crank raised in a high speed turn to allow adequate ground clearance.

Developmental test and evaluation of the embodiment, since the provisional patent application, has included timed trials over a 15.4 mile course with about 700 feet of climbing. The same rider was 16% faster on the embodiment shown in FIG. 7 than on an upright time trial type commercial race bike of about half the weight. The embodiment performance, even without use of fairings, is enough to allow a slower rider to keep pace with a faster group. The ability to apply hand power immediately, without first having to stand, allows acceleration to be initiated faster than on an upright bicycle. Remaining seated is also better aerodynamically as there is no increase in frontal area.

Since the seat and foot-pedal position are both reassuringly low, the embodiment is easy to start, stop, and learn to ride. This low and feet-forward position is also safer than an upright racing bike which seats the rider high and crouched forward to improve aerodynamics. In the embodiment, vision is forward, up and at car eye level. Eye height is kept at least 40 inches above the ground to enable seeing and being seen in traffic. Seating is comfortably reclined, lets the rider feel more in than on the bike, and is balanced between two full and equal sized wheels for low rolling resistance and good handling.

More-Detailed Discussion

The following is a more detailed discussion. Much of the focus is on moments about the steering axis because they are important to both hand power input and to bike handling.

Hand Force Input—FIGS. 8A-C

Hand force input to the crankset through the fork assembly is shown in FIGS. 8A-C. This is a simplified, front, top and side partial view of the embodiment. To simplify illustration, the steering axis 800 is vertical. FIG. 8A shows a front view of the embodiment including the front fork assembly 130, handlebar 200, right hand grip 210R, left hand grip 210L, head tube 250, steering axis 800, double triangulated torque tube fork 300, front wheel 110, crankset 100, crankshaft 400, right crank arm 242R, right pedal 240R, left crank arm 242L, and left pedal 240L. The arrows of FIGS. 8B and 8C show the right side hand and foot force input points and directions. In operation, the left side process is similar. The left and right side process is repetitive as desired by the rider. In FIGS. 8B and C, the seat (not shown) is to the left and the bicycle direction of travel is to the right.

FIG. 8B provides a side view. The frame down tubes 270U and 270L are shown attached to the head tube 250. FIG. 8C is a top view. In FIGS. 8B and 8C, the rider pulls against the right hand grip 210R as shown by arrow 810. The reaction by the headset bearings in the head tube 250 converts the linear hand force to a torque about the steering axis 800, in the direction of arrow 820. The torque is conveyed by the fork assembly 130 to the crankset. This torque urges translation of the crankshaft endpoint 830. At the same time the foot force 840 causes rotation about the crankshaft.

The total torque on the crankshaft is a function of both the hand force tending to pivot and translate the crankshaft endpoint 830; and, the foot pedal force 840 causing rotation of the crank arm about the crankshaft.

Hand Work Input—FIGS. 9A-D

The process of hand work input using handlebar displacement is an extension of hand force input. Work is defined as the application of force over a distance. Here, the rider increases the level of hand force applied, in the fashion described above, as required to displace the handlebar and to actually pivot the crankshaft about the steering axis. This pivot is in coordinated opposition to the foot force on the pedal which is causing the crank arm to rotate the crankshaft. This pivot translates the crankshaft end and thereby changes the point about which the pedal rotates during the pedal power input stroke. This change in center of rotation, that occurs while the rider is pedaling, decreases the perimeter distance traveled by the riders foot in the direction of pedal force application. Hand work input is proportional to this perimeter reduction.

This process of hand work application through crankset displacement is shown in FIGS. 9A-D. The figures are a continuation of those in FIGS. 8A-C. For clarity in FIGS. 9A-C, the handlebar 200 is shown in outline. The series of figures illustrate the riders right side power input process. In operation, the left side process is similar. The entire left and right side process is repetitive as desired by the rider.

FIG. 9A shows the initial position for application of hand power on the right side. The fork assembly is deflected about 15 degrees to the left. The rider's right foot pushes 900 against the right pedal while the right hand pulls 930 against the right handgrip. The approximate force and deflection directions are indicated by the arrows shown. At this point, the left hand grip and left foot pedal are positioned at the completion of the preceding left side stroke.

FIG. 9B shows the intermediate position where the fork assembly has been pulled back to a straight forward direction. The right foot continues to push 910 while the right hand continues to pull 940.

FIG. 9C shows the right side finish position. The fork assembly is now pivoted about 15 degrees to the right. The right foot push 920 and the right hand pull 950 are complete. Note that the left hand grip and foot pedal are now positioned to start this repetitive process on the left side.

FIG. 9D shows the effect of the motions of FIGS. 9A-C from the right side view of the fork assembly. The pivots are about the steering axis 800. The handlebar range of motion as a result of plus and minus 15 degree pivots, is shown by the two dashed circles 931, 951 at either side of the centered handlebar position 941. The corresponding range of crankshaft motion is shown by the two smaller dashed circles shown adjacent to the crankshaft. The three large diameter circles, concentric with each of the three crankshaft positions shown, are the approximate pedal circle perimeters. The center circle 960, having a solid-line is the arc of FIG. 9B. The short-dashed-line circle 970 is the arc of FIG. 9A. The long-dashed-line circle 980 is the arc of FIG. 9C. As a result of the hand induced pivot of the crankshaft about the steering axis and coordinated foot pedal rotation of that crankshaft, as shown if FIGS. 9A-C, a reduced path is traced by the riders foot in the direction of force application. This path is shown as the interior intersection of the short dashed line 970 and long dashed line 980, and is marked by 901, 911 and 921. The amount of work done by hand input is in proportion to the perimeter reduction from that of the full circle perimeter 960.

Estimates based on the embodiment geometry and plus and minus 15 degree handlebar deflections show hand work contribution of almost 20 percent. This is in addition to the hand force contribution. Riding experience suggests that the hand force contribution is greater than that of hand work. This hand force and work input causes the bike to go noticeably faster, particularly when climbing. At higher bicycle ground speeds, hand force input can be more effectively applied than hand work input.

Fork

The fork structure in FIG. 3 is made rigid in torsion and bending to the combined forces of the riders hand and foot inputs, used in opposition, for propulsive input. This torsional rigidity extends from the hand grips to the crankshaft endpoints where the crank arms are attached. This requires the handlebar and stem to also be rigid in bending.

For fork torsional rigidity, the crown length is extended along the bicycle length to a distance similar to the width across the two bottom bracket bearing clamps. The width across the clamps is limited to that required by the front wheel hub and drive assembly. When the crankset is bolted into the clamps, a rigid linear structure at the bottom of the fork is created. The fork crown and clamped crankset provide rigid linear structures at both ends of the fork blades.

Four fork blades are arrayed such that they form four contiguous triangulated structures between the crown and crankset attachments that are roughly parallel and perpendicular to the plane of the front wheel. The fork blades, crown and clamped crankset provides a double triangulated torque tube structure along the steering axis. This triangulation allows the blades to transmit rider input loads more efficiently via tension and compression rather than pure bending. This structure forms a closed roughly tubular shape, which because of crown and crankset width, is roughly octagonal as viewed from either end. A tube, and this tube approximation, is a very efficient shape for torque transmission. The structure also effectively resists pedal force bending loads.

This structure effectively transmits torque along the steering axis with minimal deflection. Prior embodiments without the double triangulated torque tube fork configuration suffered from lateral front wheel deflections. That is, a hard pedal thrust would cause the crankset and front wheel to twist within the fork structure. These deflections caused potentially dangerous steering disturbances and caused the wheel rim to hit the brake pads resulting in unwanted slowing. Significantly larger and heavier fork blade structure did not resolve the problem, nor did a single triangulation of that fork along the length of the bike. The double triangulated torque control fork has both resolved the problems and is lighter.

Fairing, Stability and Control

The front fork mounted fairing is inherently stable because it is self correcting when hit with a cross wind gust. This is achieved by locating the fairing aerodynamic center of area presented to a cross wind in front of the bike steering axis line. To a lesser extent the fairing coefficient of drag from the wind direction also has an effect.

Cross winds or gusts impacting the fairing from the side result in a moment about the steering axis from this center. As long as the center is ahead of the steering axis the moment urges the bike to steer away from the wind. This in turn causes the bike to roll back into the direction of the wind. This turn and opposite roll gives the rider time to resume normal bike control.

Enhanced control of the fairing is enabled by the essentially constant hand and foot input of pedal steering interaction that is a routine part of riding the bike. A specific method of use further increases the degree of control that can be exerted in severe gusty wind conditions. Since the bike can be better controlled while it is actively being pedaled as opposed to when it is being coasted, in the most severe gusty wind conditions, steady pedaling while lightly using brakes to maintain a safe speed allows even more effective control.

The embodiment has been safely ridden in conditions that would be difficult for a conventional un-faired bicycle. This combination of initial self correcting stability, the control provided by the pedal steering interaction, and the additional control provided by the supplemental braking method allows more routine use of a fairing, which in turn allows faster and more efficient bike operation.

Trail

Trail 161 is the distance along the ground between the front wheel contact point and the intersection of the steering axis line. Mechanical trail is that distance as measured along a line at a right angle to the steering axis. Mechanical trail is the moment arm length about the steering axis.

The level of force exerted on that moment arm is a function of the wheel/tire mass, bicycle ground speed, weight on the wheel and the tire to road coefficient of friction. At higher speeds typical of cruising, the trail induced moment limits transmission of pedal forces back to the rider. Thus high values of trail reduce pedal force feedback at speed when it is important for comfortable cruising, while allowing effective hand power input at lower speeds when most needed for acceleration and climbing. This is unlike crankshaft offset which reduces the creation of pedal induced torques about the steering axis and always interferes with hand power input. High values of trail also allows both stable and responsive handling for this FWD configuration.

A variety of prototype trail distance and steering axis angles were tested. The use of about 1 inch of trail with a 56 degree steering axis was not sufficiently stable. Use of 3.5 inches of trail with a 64 degree steering axis provided good stability. Trail of 3.5 inches resulted in handling that was less satisfactory when used with a 72 degree steering axis.

This embodiment trail of 7.8 inches and 60 degree steering axis provides good stability and performance. This much trail does cause the bike to slightly turn-in as the bike is rolled into a turn but this yaw is easily corrected by the rider. Unconscious reaction and correction by the rider is learned almost immediately.

Trail, as well as most of the following topics in this section, are further discussed and illustrated in U.S. Provisional Patent Application No. 62/741,196 filed Oct. 4, 2018, which is incorporated herein by reference.

Leverage Ratio

Leverage ratio is determined by the hand and foot moment arms about the steering axis. Leverage ratio is the mechanical advantage the rider has to balance the less powerful hand forces over foot forces. Primary elements are the handlebar width between hand grip center points and the tread. Tread, which is also known as "Q-factor," is the distance, as measured parallel to the crankshaft, from right to left pedal center points. Right and left foot force moment arms are formed by the distance from the pedal centerlines to the steering axis and are a primary source of pedal feedback transmitted to the handlebars.

Crankset

A tread of about 10 inches is common for conventional racing bikes. Excessive tread may result in slight loss of pedal stroke efficiency and rider discomfort. This embodiment tread is a reasonable 11 inches. Further reducing the tread is a challenge.

The embodiment uses crank arms 242R, 242L that have a length of 175 mm. Crank arms of 155 mm were used to investigate their ability to increase the fraction of hand work that could be applied. Although they did appear to allow an increased fraction of hand work input, the bicycle overall was slightly slower because the shorter crank arms reduced foot, and therefore overall power input.

Wheels and Brakes

Standard full size wheels are used to facilitate a smooth ride and low rolling resistance. Tire width of 32 mm is used to better withstand roadway pothole impacts. Equal size tires allows the rider to purchase and carry only one size spare for emergency repairs. There is also an aesthetic appeal to front and rear wheel symmetry.

Inertial effects of the front wheel acting through the trail moment arm, are at least partially responsible for PFF mitigation with speed. Although generally not desirable, and not necessarily needed, increased tire mass would increase the effect. This heavier front tire would have the additional benefit of reducing the need for on road flat tire repair. Although not difficult, emergency replacement of a front tube is not convenient. Quick releases, rather than the use of socket head cap screws for the crankshaft bearing clamps, and use of a spring loaded chain idler wheel, instead of adjustment screws for secondary chain tension adjustment, would facilitate flat tire repair of future embodiments.

Front and rear linear pull brakes are used. Although brakes of any conventional type can be used, the aerodynamic efficiency of the embodiment often requires extended and heavy use of breaks, particularly with the fairing(s), to keep safe speeds on descents.

Power Transmission

The power transmission system support structure, which is attached to the fork, maintains the necessary alignments, withstands chain line tension forces, and supports the derailleur, secondary shaft and the output chain tension adjustment screws. The embodiment gear range of 420 percent has proven adequate for sport riding, however the wider range (about 500 percent) provided by available 12 speed systems would be useful for more heavily loaded commuting and touring applications. The value would be even greater for a streamlined sport touring application.

Frame

This embodiment is recumbent because the frame establishes an angle between the steering axis and the general line of rider pedal force input that is more perpendicular than parallel.

Wheelbase is the distance between the front and rear axles. The 60 inch wheelbase used is just adequate for a rider that is 75 inches tall to aerodynamically recline to an eye height of about 40 inches above ground level. An extended wheelbase improves the ride by reducing the impact on the rider of bumps in the road. The frame does not need to be rigid to rear wheel drive chain line tensions and can be vertically compliant for a smoother ride.

Wheelbases as short as 52 inches were tested. The shorter bike is slightly lighter, easier to store and transport. Conversely, a shorter wheelbase requires a higher seat height and a more upright seat back position which can increase the aerodynamic frontal area and decrease comfort. A shorter wheelbase also shifts the bicycle center of gravity toward the rear wheel, which is undesirable because a roughly even to slightly front heavy balance improves front wheel drive traction, bike handling and cornering.

Steering Axis Angle

Steering axis angles of 56, 60, 64 and 72 degrees were tested. Handling was acceptable across this range. The 72 degree head tube placement did however require additional frame structure and stem length, both of which are undesirable.

The steering axis angle largely establishes the reaction vice transmission fraction of pedal and hand power input torques about the steering axis. More vertical angles allow increased transmission while more horizontal angles increase frame reaction. Transmission is required for pedal steering interaction and hand power input. There is also a relationship between the rider seat height and recline angle as the rider can most effectively apply hand power when their arms are more perpendicular to the steering axis. Currently, 60 to 65 degrees seems to provide a good overall balance.

Handlebar Offset

Handlebar offset is the perpendicular distance from the steering axis to a line between the right and left hand grip center points. Handlebar offset from the steering axis degrades the ability to apply hand power by changing the moment arm length and the direction of hand force input application. Offset results in an "orbit" of the handlebar at the offset distance, as opposed to a more efficient pivot of the handlebars about the steering axis. The more lateral motion caused by offset also hinders application of the large upper body muscle groups. Handlebar motion achieved by placing the handlebars on the steering axis is more effective.

Nonetheless, the embodiment handlebars are offset by about 10.5 inches. This high offset was selected to improve aerodynamics at the cost of more effective hand power input. The offset allows the lower presented area of a more reclined seating position. Although hand power input can still be applied, less offset would allow better climbing and acceleration.

Crankshaft Offset

The embodiment crankshaft centerline is on the steering axis. Although crankshaft centerline standoff (i.e. crankshaft offset) is used in the prior art to reduce PFF, it is not used in this embodiment because it interferes with hand power application.

Crankshaft offset in front of the steering axis increases the tread moment arm length and changes the direction at which pedal force is applied about that moment arm. As forward offset increases, the resulting pedal force vector causing rotation is reduced and the frame reaction to pedal force increases. Thus pedal force feedback is reduced. As is the effectiveness of hand power input. Offset also causes increased crankset lateral deflection during hand work input. Although the motion is generally not in alignment with the direction of pedal force input, it is not desirable.

Seat and Handlebar Elevation

Parallel alignment of the riders upper body and the steering axis is most efficient for hand power input. The most effective application of upper body muscles is a pushing and pulling motion with the arms extended, at about shoulder width and perpendicular to the steering axis.

An issue with an upright (60 degree) seatback angle, is that much of the riders body weight is supported by their seat and less by their back. This causes discomfort on extended rides. This issue is resolved by the mid section of the seat back being reclined at about 40 degrees and the upper section, that supports the chest and shoulders, being more parallel to the steering axis. The upward seat back curve also provides a more natural head up and eyes forward position. The embodiment seat configuration is comfortable for extended rides.

The level of foot pedal force reaction against the seat, because of upper body reaction to pedal forces, is less than that of a standard recumbent. The seat assembly is nevertheless attached to the frame using standard components.

The embodiment handlebar position is elevated by the upward angled stem. This provides knee clearance and an arm angle that is more perpendicular to the steering axis. The elevated handlebar and upper seat back provide excellent mounting points, respectively, for a head and a tail light. These elevations are consistent with the handlebar and seat tube mounting points on a conventional upright bike. Lightweight, inexpensive lights that include a flashing function, which is highly visible even in daylight, have recently become widely available. To the extent visibility in traffic is determined by these lights, this recumbent embodiment can be seen by traffic as well as an upright bike.

CONCLUSIONS, RAMIFICATIONS AND SCOPE

Disclosed is a recumbent bicycle and methods of use that allow hand power input comparable to standing and pedaling a conventional upright bicycle; and, effective control of the inherently stable aerodynamic fairing. Rather than attempt to eliminate pedal force feedback, the mechanism of pedal steering interaction is managed and used for supplemental hand power propulsion. The embodiment combines and improves on many of the best attributes of upright bicycles, recumbent bicycles and of streamlined velomobiles. Velomobiles, which are usually low, wide, tricycles, can be dangerous to operate on a narrow roadway shoulder with traffic. The result is a better bike that can be used by more people for transportation, recreation, fitness and sport.

While the disclosure contains many specifics, they should not be construed as limitations on the scope, but rather as an exemplification of embodiments thereof. Modifications and variations are possible in light of this disclosure, and further variations may be acquired from practice of the implementations. It is intended that this be covered by the specification and the following claims.

Specific additional embodiments within this scope include:
- a) An alternative fork crown shape, of the same basic size and proportions, consisting of an oval half section open to the tire; a channel section facing down above the oval, both pieces edge joined along their length, with plates joined over the ends, and a top "hip roof" type structure connecting the channel top perimeter to the steerer tube. The oval half section fits better around the tire, the boxed channel section provides necessary rigidity and the "hip roof" section transfers loads to the steerer tube.
- b) Alternative drive systems can be used. A similar double chain configuration could use a conventional bicycle rear-wheel-hub-gear transmission instead of the derailleur based assembly. The secondary shaft could also be a single speed ratio either with or without the wheel mounted freewheel, forming a single-speed or a fixed-gear bicycle. If a suitable configuration becomes available, a chainless, direct drive transmission within the body of the front wheel hub could also be used.
- c) A less extensive, simpler, lighter and more aerodynamic derailleur system structure could result from placing both the input and output chains on the right side of the front wheel. This would also allow use of a standard front wheel disc brake.
- d) Fairing system elements, in addition to front and rear sections shown, can include a windshield and/or a canopy, a frame mounted mid body section and flexible fabric type connections. Fenders, cargo and storage capacity can be integrated. A chain box to keep the chain, bike and rider clean could also be integrated. Monocoque construction could integrate frame and fairing elements at a reduced overall weight.
- e) The rear wheel assembly can be replaced by two wheels thereby forming a tricycle. This includes a configuration with very narrow rear wheel spacing having known mechanism that can allow those wheels to lean into turns for stability. This tricycle would not need to be low and wide for stability in turns, would be easier for traffic to see and avoid and could therefore be more safely operated in traffic and on roads with limited width shoulders.
- f) The embodiment could be built into a two wheel drive recumbent tandem bicycle. The stoker drive would be an independent conventional rear wheel drive system. This tandem would allow hand power input by the captain. Standing to apply hand power on an upright tandem is hard to effectively coordinate. Two wheel drive benefits would also include the ability to traverse steep hills with loose or slick surfaces.
- g) Front wheel hubs with very large inside diameter bearings and even hub-less front wheels are known. Their use may allow alternative power transmission systems and would allow the decoupling of the crankshaft steering axis standoff and trail that is inherent with a coaxial configuration.

I claim:

1. A recumbent bicycle propelled by foot pedals and supplemental hand power comprising;
   - A. a frame which is attached to a front fork such that a steering axis is created about which said front fork is free to pivot with respect to said frame;
   - B. a seat which is attached to said frame and located to establish a rider's foot pedal force input direction to be more perpendicular than parallel relative to said steering axis;
   - C. at least one rear wheel which is rotatably attached to said frame;
   - D. a handlebar, which is rigid and is rigidly attached to said front fork, said handlebar also having a right and left handgrip;
   - E. a front wheel which is rotatably attached to said front fork;
   - F. a foot pedal crankset comprising a crankshaft, a right crankarm having a first end attached to a right crankshaft endpoint, and a left crankarm having a first end attached to an opposing left crankshaft endpoint, a right pedal attached to a second end of the right crankarm, and a left pedal attached to a second end of the left crankarm;
   - G. said crankshaft is rotatably connected to said front fork, the connection is within the front wheel perimeter, said crankshaft moves with the front fork as the front fork pivots about the steering axis;
   - H. a means for rotational power transmission from said crankshaft to said front wheel;
   - I. said front fork is rigid in torsion about the steering axis to transmit hand power input from the handlebar to the crankset and comprises;
     - a. a fork crown, said fork crown having a crown length along the bicycle length that is greater than a width of said crown;
     - b. a steerer tube, which is rigidly attached to the crown;
     - c. a headset bearing seat attached to any one of the steerer tube, the fork crown, or both the steerer tube and the fork crown;
     - d. one or more right and left side fork blades;
     - e. a right and a left crankset attachment;
     - f. said right and left side fork blades attach the crown respectively to the right and left crankset attachments;
     - g. the right and left side fork blades each are connected to the fork crown either directly adjacent to or in contact with a pair of opposing end faces of the fork crown;
     - h. said right and left side fork blades diverge from one another across the width of the bicycle from the fork crown to the right and left crankset attachments;
     - i. said right and left side fork blades converge, along the length of the bicycle, from the fork crown to the right and left crankset attachments;
     - j. the distance that said right and left side fork blades diverge from one another across the width of the bicycle is similar to the distance that the right and left side fork blades converge along the length of the bicycle;
k. the fork crown and left and right side fork blades forming a structure that is, when attached to the crankset, triangulated along a width and a length of the bicycle so that left and right fork blade tension and compression aids transmission of torsional forces about and along the steering axis;

J. wherein said bicycle is configured so that hand force can be applied to left and right handgrips in coordinated opposition to foot pedal input generating a hand induced pivot of the front fork and the crankset assembly about the steering axis defining supplemental propulsive power to the crankshaft, whereby the effect is analogous to a rider standing to pedal a conventional upright bike and adding hand power by tilting the upright bike away from the descending pedal.

2. The recumbent bicycle of claim 1 wherein the perpendicular distance from the steering axis line to the right or left handgrip is greater than the perpendicular distance from the steering axis line to the right or left crankshaft-to-crankarm connection point, so that a hand over foot force leverage ratio about the steering axis is created which allows the rider's hand forces to control foot force about the steering axis, to provide hand power input as torsional force, and to provide hand power input as pivoting rotation of the fork assembly about the steering axis.

3. The recumbent bicycle of claim 1, wherein the crankshaft has an axis of rotation due to foot pedal input and that axis is perpendicular to and intersects the steering axis of rotation so that hand power is more effectively applied than if the crankshaft were offset from the steering axis.

4. The recumbent bicycle of claim 1 wherein there is at least 5 inches of trail, so that the rider can effectively add hand power and so that pedaling induced interference about the steering axis is increasingly controlled with bicycle ground speed because the stabilizing force applied by the front wheel to the trail moment arm increases with ground speed.

5. A recumbent bicycle propelled by foot pedals and supplemental hand power comprising;
A. a frame which is attached to a front fork such that a steering axis is created about which said front fork is free to pivot with respect to said frame;
B. a seat which is attached to said frame;
C. at least one rear wheel which is rotatably attached to said frame;
D. a handlebar attached to said front fork, said handlebar also having a right and left handgrip;
E. a front wheel which is rotatably attached to said front fork;
F. a foot pedal crankset comprising a crankshaft, a right crankarm having a first end attached to a right crankshaft endpoint, and a left crankarm having a first end attached to an opposing left crankshaft endpoint, a right pedal attached to a second end of the right crankarm, and a left pedal attached to a second end of the left crankarm;
G. said crankshaft is rotatably connected to said front fork, said crankshaft moves with the front fork as the front fork pivots about the steering axis;
H. a means for rotational power transmission from said crankshaft to said front wheel;
I. said front fork is rigid in torsion about the steering axis to transmit hand power input from the handlebar to the crankset;

a. said front fork includes a crown structure, a right and a left fork blade structure, and a right and a left crankset attachment;
b. the right and left fork blade structures connect the crown structure to the right and left crankset attachments;
c. the crown structure is longer, along the length of the bicycle, than it is wide;
d. the right and left fork blade structures diverge from one another across the bicycle width from the crown structure to the respective crankset attachment;
e. the right and the left fork blade structures converge along the length of the bicycle from the crown structure to the respective crankset attachment;
J. the crown and left and right fork blade structures, when attached to the crankset, create a front fork structure that is triangulated along a width and a length of the bicycle so that tension and compression within the left and right fork blade structures aids transmission of torsional forces about and along the steering axis;
K. wherein said bicycle is configured so that hand force can be applied to left and right handgrips in coordinated opposition to foot pedal input generating a hand induced pivot of the front fork and the crankset assembly about the steering axis, thereby providing supplemental propulsive power to the crankshaft, whereby the effect is analogous to a rider standing to pedal a conventional upright bike and adding hand power by tilting the upright bike away from the descending pedal.

6. The recumbent bicycle of claim 5 wherein the perpendicular distance from the steering axis line to the right or left handgrip is greater than the perpendicular distance from the steering axis line to the right or left crankshaft-to-crankarm connection point, so that a hand over foot force leverage ratio about the steering axis is created which allows the rider's hand forces to control foot force about the steering axis, to provide hand power input as torsional force, and to provide hand power input as pivoting rotation of the fork assembly about the steering axis.

7. The recumbent bicycle of claim 5 wherein the crankshaft has an axis of rotation due to foot pedal input that is perpendicular to and intersects with the steering axis of rotation so that;
A. the crankshaft is not offset from the steering axis; and
B. rider handgrip input transmitted to the crankset is effectively converted to propulsive power.

8. The recumbent bicycle of claim 5 having a front wheel trail whereby the rider can effectively apply supplemental hand power about the steering axis at lower bicycle ground speeds where it is particularly useful for enhanced acceleration and hill climbing, while pedal force induced torques about the steering axis which are potentially tiring to the rider are increasingly controlled as bicycle ground speed increases.

9. A method of riding a recumbent bicycle which can be propelled by foot pedals and supplemental hand power comprising;
A. providing said recumbent bicycle comprising;
a. a frame which is attached to a front fork such that a steering axis is created about which said front fork is free to pivot with respect to said frame;
b. a seat which is attached to said frame;
c. at least one rear wheel which is rotatably attached to said frame;
d. a handlebar attached to said front fork, said handlebar also having a right and left handgrip;

e. a front wheel which is rotatably attached to said front fork;

f. a foot pedal crankset comprising a crankshaft, a right crankarm having a first end attached to a right crankshaft endpoint, and a left crankarm having a first end attached to an opposing left crankshaft endpoint, a right pedal attached to a second end of the right crankarm, and a left pedal attached to a second end of the left crankarm;

g. said crankshaft is rotatably connected to said front fork, said crankshaft moves with the front fork as the front fork pivots about the steering axis;

h. a means for rotational power transmission from said crankshaft to said front wheel;

i. said front fork is rigid in torsion about the steering axis to transmit hand power input from the handlebar to the crankset;
   i. said front fork includes a crown structure, a right and a left fork blade structure, and a right and a left crankset attachment;
   ii. the right and left fork blade structures connect the crown structure to the right and left crankset attachments;
   iii. the crown structure is longer, along the length of the bicycle, than it is wide;
   iv. the right and left fork blade structures diverge from one another across the bicycle width from the crown structure to the respective crankset attachment;
   v. the right and the left fork blade structures converge along the length of the bicycle from the crown structure to the respective crankset attachment;

j. wherein the crown and left and right fork blade structures, when attached to the crankset, create a front fork structure that is triangulated along a width and a length of the bicycle so that tension and compression within the left and right fork blade structures aids transmission of torsional forces about and along the steering axis;

k. wherein said bicycle is configured so that hand input can be applied to left and right handgrips in coordinated opposition to foot pedal input generating a hand induced force or force and pivot of the front fork and the crankset assembly about the steering axis, thereby providing supplemental propulsive power to the crankshaft;

B. riding in a manner otherwise consistent with normal bicycle operation, while seated with right and left hands and feet respectively on the right and the left handgrips and on the right and the left pedals;

C. selecting a method of propulsion for each right or left foot pedal force input stroke from any one of;
   a. applying hand force to the handgrips just equal and in coordinated reaction to that resulting about the steering axis from the foot pedal force input, thereby pedaling efficiently, without the loss of foot pedal propulsive power, and without the addition of supplemental hand power; or,
   b. applying hand force to the handgrips greater than and in coordinated opposition to that resulting about the steering axis from the foot pedal force input, thereby adding hand force based power to the foot pedal crankshaft in the form of supplemental propulsive torque; or,
   c. applying hand force to the handgrips greater than and in coordinated opposition to that resulting about the steering axis from the foot pedal force input, and pivotally displacing the handgrips about the steering axis in coordinated opposition to foot pedal force input, thereby adding supplemental propulsive hand power to the foot pedal crankshaft in the form of torque and displacement which is hand work.

10. The method of riding the recumbent bicycle of claim 9 wherein the rider further increases the hand force applied to the handgrips while also increasing the level of foot pedal force input so that an increased level of both hand and foot force based power is provided to the crankshaft.

11. The method of riding the recumbent bicycle of claim 9 wherein the rider hand work input causes rotation of the front fork assembly to an angle of at least 15 degrees from straight ahead and then, in coordinated opposition to foot pedal force input from the other foot, rotates the fork assembly a total of at least 30 degrees from that position in the opposite direction.

12. The method of riding the recumbent bicycle of claim 9 further comprising;
   A. providing any one of a fork mounted aerodynamic front fairing, which for increased stability has an aerodynamic center of pressure which is located forward of the steering axis; an aerodynamic front wheel, or a combination of the fork mounted aerodynamic front fairing and the aerodynamic front wheel;
   B. providing brakes;
   C. reacting to potentially destabilizing wind impacts by selecting the method of propulsion for each right or left foot pedal force input stroke from any one of;
      a. continuing to pedal and provide opposed hand and foot input to maintain the level of directional control provided by the frequency, duration, magnitude and opposed nature of the hand and foot force induced moments about the steering axis; or,
      b. exerting increased control by increasing the hand and foot force levels applied during continued pedaling; or,
      c. exerting increased control while also controlling ground speed as desired, by increasing the hand and foot force levels applied during continued pedaling while also applying brakes;
whereby the rider continues to pedal to avoid the reduction in control resulting from the natural tendency to stop pedaling when subjected to buffeting of front fork mounted aerodynamic devices, can increase that level of control by pedaling harder, and can also control bicycle ground speed as desired.

13. The recumbent bicycle from claim 5, further comprising an aerodynamic front wheel.

14. The recumbent bicycle from claim 5, further comprising a fairing connected to said front fork.

* * * * *